US010780665B2

(12) United States Patent
Skocypec et al.

(10) Patent No.: US 10,780,665 B2
(45) Date of Patent: *Sep. 22, 2020

(54) DYNAMICALLY ADJUSTABLE SENSORS FOR TRASH COMPACTORS AND RECEPTACLES

(71) Applicant: Big Belly Solar, Inc., Newton, MA (US)

(72) Inventors: David J. Skocypec, Medfield, MA (US); Jeffrey T. Satwicz, Weston, MA (US); Douglas J. Furciniti, Groton, MA (US); Michael E. Feldman, Framingham, MA (US)

(73) Assignee: BIG BELLY SOLAR LLC, Needham, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/266,974

(22) Filed: Feb. 4, 2019

(65) Prior Publication Data
US 2019/0176426 A1 Jun. 13, 2019

Related U.S. Application Data

(63) Continuation of application No. 15/117,477, filed as application No. PCT/US2015/015232 on Feb. 10, 2015, now Pat. No. 10,195,807.
(Continued)

(51) Int. Cl.
B30B 9/30 (2006.01)
B30B 15/28 (2006.01)
(Continued)

(52) U.S. Cl.
CPC .......... B30B 9/3007 (2013.01); B30B 9/3032 (2013.01); B30B 15/28 (2013.01);
(Continued)

(58) Field of Classification Search
CPC .. G05B 15/02; B65F 1/1426; B65F 2210/128; B65F 2210/1443;
(Continued)

(56) References Cited

U.S. PATENT DOCUMENTS 4,365,702 A * 12/1982 Tolasch ..................... A24C 5/35
198/347.3
2002/0108507 A1 * 8/2002 May ....................... B65F 1/1638
100/45
(Continued)

FOREIGN PATENT DOCUMENTS

GB 2321518 7/1998
WO WO 03/007249 1/2003

Primary Examiner — Tuan C Dao

(57) ABSTRACT

Systems, methods, and computer-readable storage media for dynamically adjusting sensors for use in compactors and receptacles. A receptacle first sends a signal from a transmitter on a first module in a receptacle to a receiver on a second module in the receptacle, wherein the first module is located on a first inner wall of the receptacle and the second module is located on a second inner wall of the receptacle, and wherein at least part of the first module and the second module is located a distance above a bin inside the receptacle. Next, the receptacle determines a signal-detection characteristic including a signal detection status or a number of signal pulses associated with a signal detection. Based on the signal-detection characteristic, the receptacle determines an operating condition of the receptacle, the operating condition including a fullness level or an obstruction level associated with the first or second sensors.

20 Claims, 8 Drawing Sheets

Related U.S. Application Data

(60) Provisional application No. 61/937,930, filed on Feb. 10, 2014, provisional application No. 61/937,961, filed on Feb. 10, 2014.

(51) Int. Cl.
  *B65F 1/14* (2006.01)
  *G08B 13/08* (2006.01)
  *G05B 15/02* (2006.01)

(52) U.S. Cl.
  CPC .............. *B65F 1/14* (2013.01); *B65F 1/1426* (2013.01); *G05B 15/02* (2013.01); *G08B 13/08* (2013.01); *B65F 2210/108* (2013.01); *B65F 2210/128* (2013.01); *B65F 2210/148* (2013.01); *B65F 2210/1443* (2013.01); *B65F 2210/168* (2013.01); *B65F 2210/172* (2013.01); *B65F 2210/182* (2013.01); *B65F 2210/20* (2013.01)

(58) Field of Classification Search
  CPC .......... B65F 2210/168; B65F 2210/172; B65F 2210/20; B65F 1/14; B65F 2210/108; B65F 2210/148; B65F 2210/182; B30B 9/3007; B30B 15/28
  See application file for complete search history.

(56) References Cited

U.S. PATENT DOCUMENTS

| | | |
|---|---|---|
| 2005/0279615 A1 | 12/2005 | Benninger |
| 2006/0143439 A1 | 6/2006 | Arumugam |
| 2006/0150645 A1 | 7/2006 | Leaver |
| 2007/0039364 A1 | 2/2007 | Smith |
| 2008/0141625 A1* | 6/2008 | Bilkie .................... B65B 55/20 53/396 |
| 2008/0190020 A1* | 8/2008 | Todd .................... A01G 25/167 47/48.5 |
| 2010/0071572 A1 | 3/2010 | Carroll |
| 2011/0247663 A1 | 10/2011 | Gadini |
| 2013/0305481 A1 | 11/2013 | Jung |
| 2013/0346229 A1* | 12/2013 | Martin ................... G06Q 50/06 705/26.3 |
| 2014/0025589 A1 | 1/2014 | Yang |
| 2014/0172174 A1 | 6/2014 | Poss |

* cited by examiner

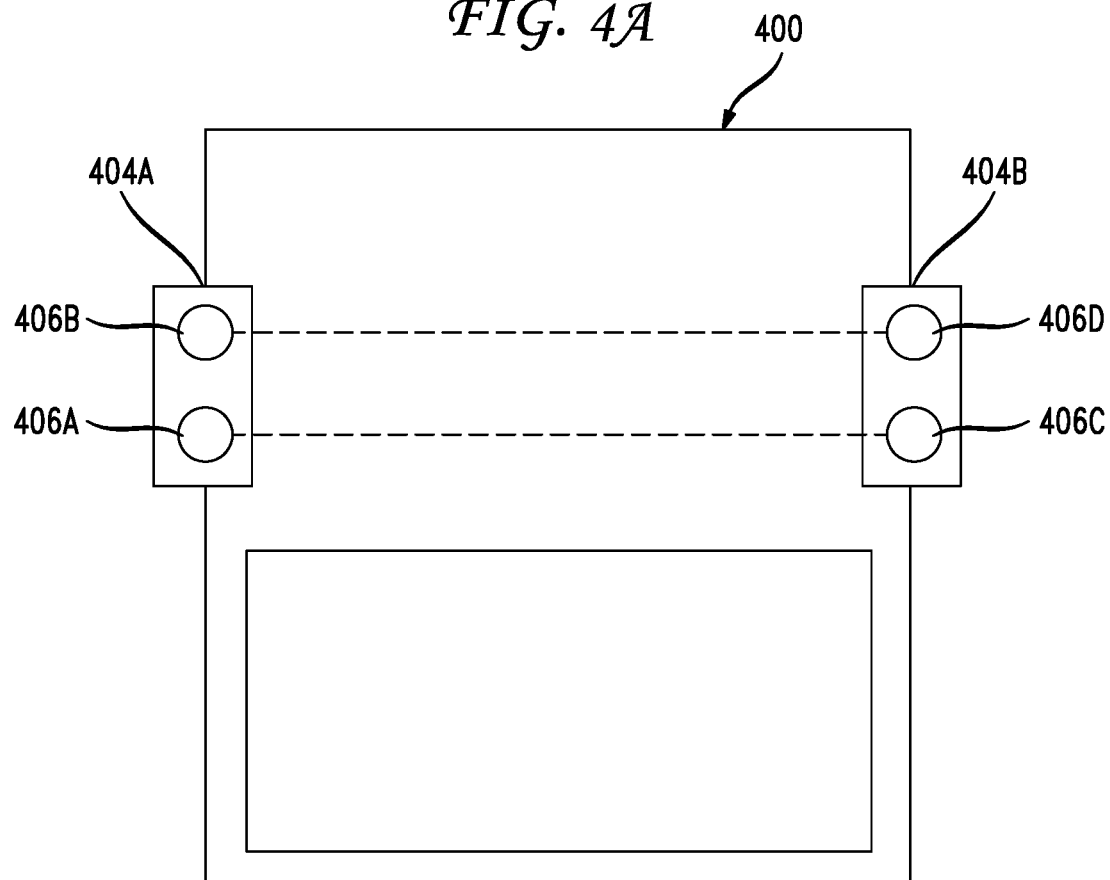
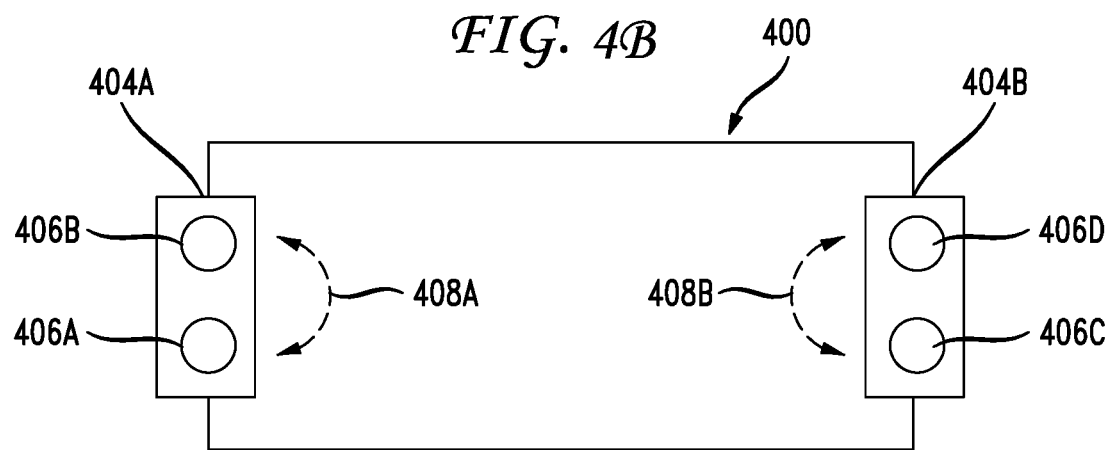

FIG. 5
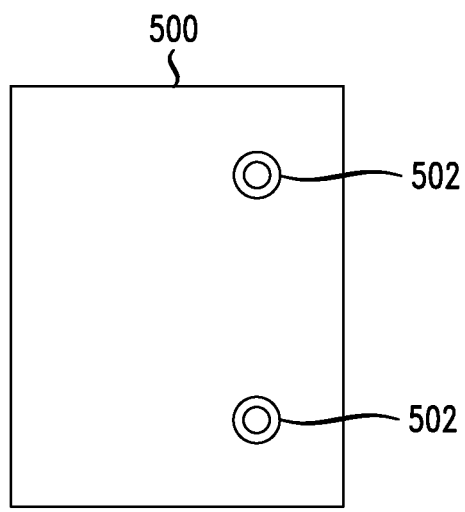
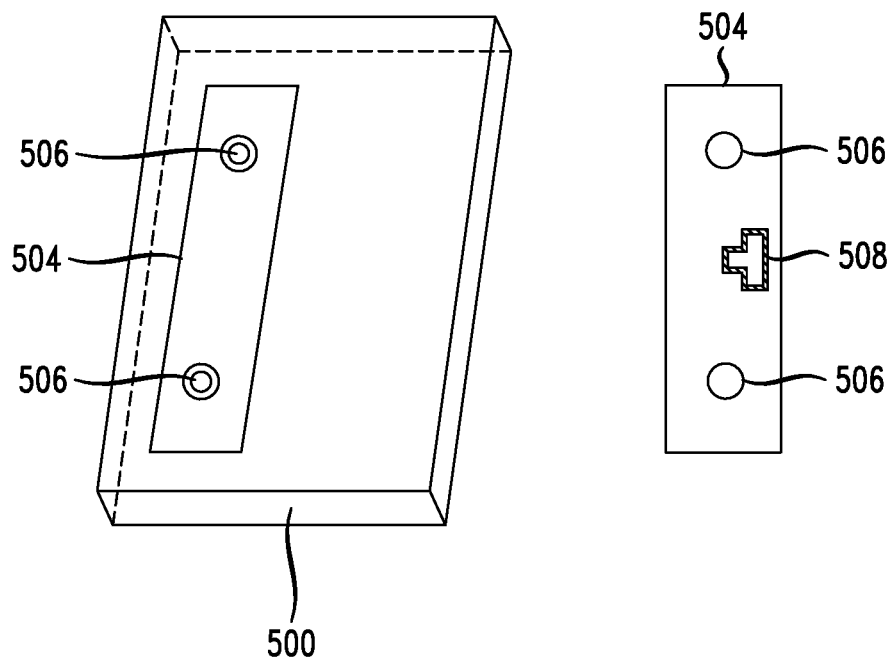

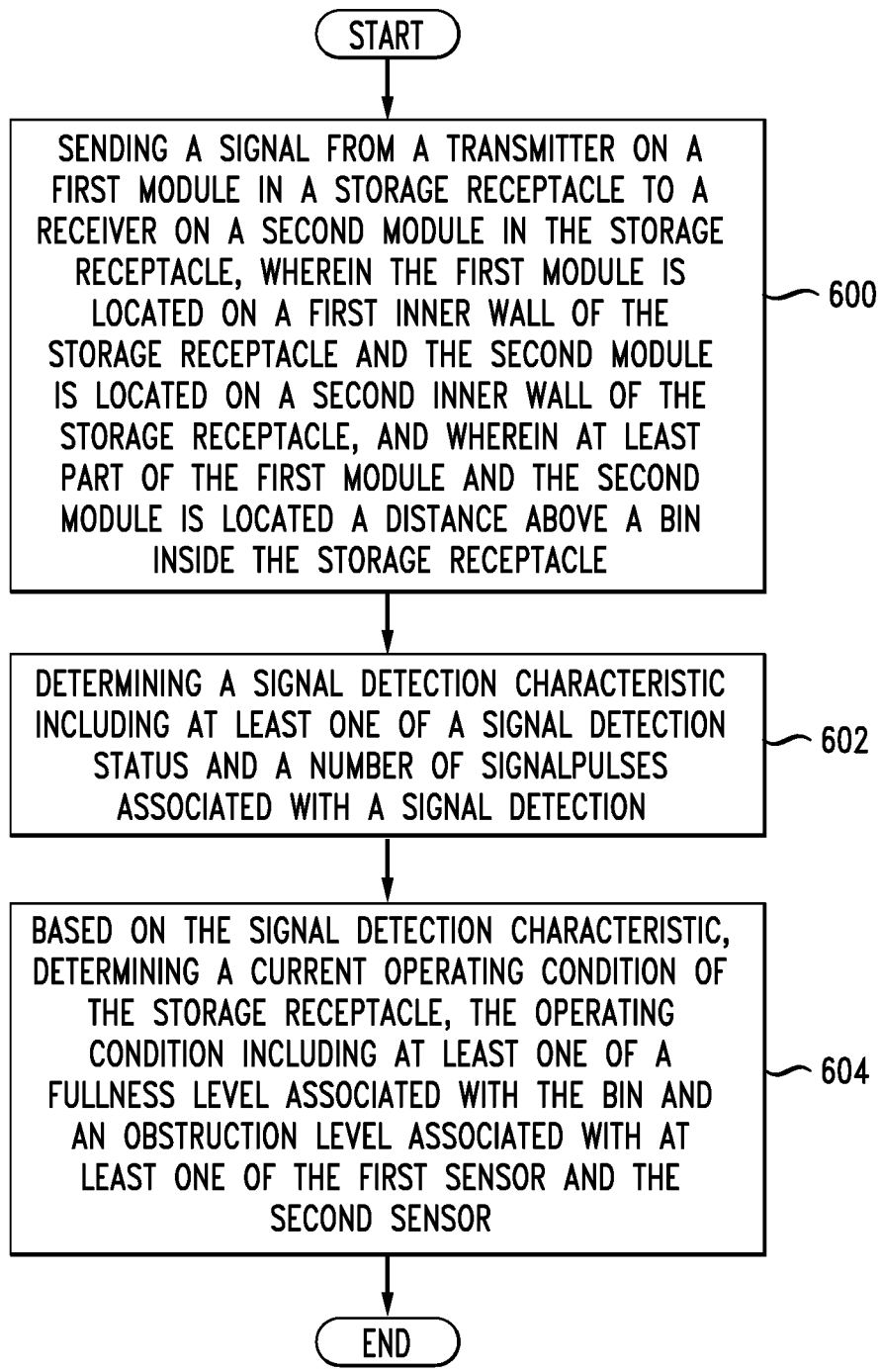

DYNAMICALLY ADJUSTABLE SENSORS FOR TRASH COMPACTORS AND RECEPTACLES

CROSS REFERENCE TO RELATED APPLICATIONS

The present application is a continuation of U.S. patent application Ser. No. 15/117,477, filed Aug. 9, 2016, which claims the benefit of priority to PCT/US15/15232, filed Feb. 2, 2015, which claims the benefit of priority to U.S. Provisional Application No. 61/937,961, filed on Feb. 10, 2014, and U.S. Provisional Patent Application No. 61/937,930, filed on Feb. 10, 2014, all of which are expressly incorporated by reference herein in their entirety.

BACKGROUND

1. Technical Field

The present disclosure relates to trash receptacles and more specifically to dynamically adjustable sensors for use with trash compactors and receptacles.

2. Introduction

Collection of solid waste is an expensive and polluting procedure. Every day, heavy trucks are deployed to collect trash and recyclable materials. However, there is significant waste in the current waste collection solutions. For example, collections or compactions are often made to receptacles which are not full and, in fact, are capable of holding additional waste. Many times, trash compactions are run too frequently or infrequently, thereby resulting in inefficient operation. Moreover, current solutions do not provide a proper mechanism to dynamically adapt the compaction schedules to meet accurate demands.

The receptacles and compactors for waste and recyclables used by the current collection solutions are also prone to poor utilization. As a result, high implementation, operational and service costs are incurred by the current collection solutions. For example, costly components, such as motors, batteries and various sensors and electronics, are typically used to power a compactor or a communicating device. Here, such components are not prudently applied or efficiently driven. Also, communications costs are typically high, as communications components are often not used efficiently. In some cases, costly networks are used even when free networks are otherwise available.

In addition, current solutions lack effective and efficient means for dynamically identifying obstacles such as dirt and waste materials in a receptacle (or any of its components), and promptly making appropriate and intelligent adjustments. Yet waste collection can be a messy endeavor, and, not surprisingly, the operations and components of the trash receptacles used for waste collection can easily become clogged, encumbered, or inefficient, particularly as waste contents increase.

This problem is exacerbated by the static design and operational parameters of the current receptacles and compactors, which often prove to be inadaptable to the environment or evolving standards and practices. For example, standard receptacles and compactors are generally limited in their applicability to various types of locations and operations. As a result, current solutions are not robust, and provide limited flexibility and adaptability.

SUMMARY

Additional features and advantages of the disclosure will be set forth in the description which follows, and in part will be understood from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to dynamically adjust compactions and sensing operations in a trash receptacle. Using sensors, emitters, and receivers inside the receptacle, these approaches can be implemented to intelligently determine when a compaction needs to be run in a trash receptacle. Here, sensors can be positioned in different angles and locations within the trash receptacle to increase or decrease the number or frequency of waste detections triggering a compaction. For example, the sensors inside the receptacle can be shifted upward to ensure that fewer compactions are triggered when the machine is in a high-use area or is operating in a low-powered capacity or mode. Alternatively, the sensors inside the receptacle can be lowered to ensure that waste contents are detected more frequently and, consequently, compactions are triggered with greater frequency. This can provide a great benefit when compaction requirements are high, for example. Moreover, if compaction or power demands shift, the machine can dynamically adapt accordingly.

Furthermore, trash receptacles can be fitted with multiple sensors or photo-eye beams to allow the trash receptacles to operate in different modes, such as lower or higher detection modes. For example, a transmitter and receiver may be positioned at a first elevation within the receptacle for sensing whether the trash has reached the height at which compaction should occur. However, another transmitter and receiver can be positioned at a higher, second elevation and the system and methods disclosed herein enable the receptacle to strategically select which set of transmitter/receiver to use for detection of trash height and compaction based on a number of factors. Software or instructions in the storage receptacles can be configured to monitor sensors and signals inside the storage receptacles, and determine the levels of obstruction or dirt on the sensors or any other components inside the storage receptacles. The software or instructions can also calculate specific dirt or obstruction levels and use such calculations to trigger various operations and modes of operation for better performance.

Disclosed are systems, methods, and non-transitory computer-readable storage media for dynamically adjusting sensors for use in trash compactors and receptacles. A storage receptacle, such as a trash compactor or receptacle, first sends a signal from a transmitter on a first module in a storage receptacle to a receiver on a second module in the storage receptacle, wherein the first module is located on a first inner wall of the storage receptacle and the second module is located on a second inner wall of the storage receptacle, and wherein at least part of the first module and the second module is located a distance above a bin inside the storage receptacle. The first module and the second module can each include one or more sensors. The sensors can include an emitter and a receiver for sending and receiving signals. Moreover, the sensors can include a photoeye sensor, a motion sensor, a proximity sensor, a sonar sensor, a noise sensor, an image sensor, a camera, etc.

In some embodiments, the sensors are photoeye sensors. Moreover, the first and second modules can include additional sensors. For example, the first and second modules can each include two or more sensors spaced a distance apart and having different heights in relation to the bin.

In some configurations, the first and second modules can each include an input and an output sensor. For example, the first module can include a first output sensor and, above the first output sensor, an input sensor. The second module can then include a second input sensor and, above the second input sensor, a second output sensor. This way, the lower output and input sensors can be configured to detect contents inside the bin at the lower position, and the raised or higher output and input sensors can be configured to be activated to detect contents inside the bin at the elevated position at times when it is more desirable to implement the raised sensors as opposed to the lower sensors. For example, the lower sensors may be implemented when more compactions are desired, and the raised sensors can be implemented when running in a power-saving mode.

Moreover, the first and second inner walls can refer to parallel walls, adjacent walls, opposite walls, etc. For example, the first inner wall can be a wall on the left side of the receptacle and the second inner wall can be on the right side of the receptacle. Here, the modules and sensors can face each other. In some embodiments, the first inner wall can be a top wall which can include the inner top or ceiling of the receptacle, and the second inner wall can be a lower wall facing the top wall from a lower position such as a floor or divider. For example, the top wall can be the ceiling of the inside of the receptacle, as previously suggested, and the lower wall can be the top of the bin inside of the receptacle, which can serve as a floor facing the top wall.

In some cases, the receptacle can replace the second module with a mirror or another component capable of reflecting light or signals. For example, the receptacle can include the first module, and instead of, or in addition to, the second module, a mirror strategically placed inside the receptacle to reflect light or signals transmitted from a transmitter associated with the first module. In this regard, the transmitter can send the signal to a mirror that reflects the signal back to the first module and allows the receiver on the first module to receive the signal from the transmitter. In fact, the receptacle can be configured to include one or more additional mirrors or reflectors that allow a signal from the transmitter to bounce one or more times inside the receptacle before reaching the receiver. The number of mirrors or modules implemented can be based on operating conditions, preferences, receptacle size and shape, usage expectations or demands, location, policies, rules, etc.

In some cases, the receptacle can include a first mirror configured to reflect a signal from a transmitter on a first module to a receiver on the first module, and a second mirror configured to reflect the signal from a transmitter on a second module to a receiver on the second module. This way, the receptacle can be configured to use the first module and first mirror under normal conditions, and switch to the second module and second mirror under varying conditions, such as faulty conditions. To this end, the multiple modules and mirrors can provide redundancy, fault tolerance, or different operating modes, for example. In some cases, every side in the inside of the receptacle can include a mirror device or a module, including the roof/ceiling and floor of the receptacle. The floor of the receptacle can refer to the actual floor of the receptacle and/or the top of the bin inside of the receptacle, which provides a floor to the upper, inside portion of the receptacle. Here, the bin can be equipped with a top mirroring panel, a module on the bin's roof or top, or a module placed on top of the bin.

Next, the storage receptacle determines a signal-detection characteristic including at least one of a signal detection status and a number of signal pulses associated with a signal detection. The signal-detection characteristic can include signal input and output characteristics. For example, the signal-detection characteristic can include whether the signal was detected at all, how many pulses were transmitted before the signal was detected or received, or any other traits or parameters of the signal. Thus, the number of signal pulses associated with the signal detection can refer to the number of pulses before the signal was detected, or the number of pulses without a signal detection at all.

Based on the signal-detection characteristic, the storage receptacle then determines a current operating condition of the storage receptacle, the operating condition including at least one of a fullness level associated with the bin and an obstruction level associated with at least one of the first sensor and the second sensor. For example, the storage receptacle can determine whether the signal was detected or received at all based on the signal-detection characteristic, and determine that there is currently an obstruction inside the storage receptacle based on a failure to detect or receive the signal. Moreover, the storage receptacle can also determine the obstacle levels, such as a dirt level on the sensor or transmitter, based on the number of pulses until the signal is detected or received. In some cases, as the sensors are clogged, dirty, or obstructed to a greater degree, it typically takes a greater number of pulses until the signal is successfully detected or received. Accordingly, the number of pulses can be used to calculate the obstruction levels of one or more sensors. Obstruction levels can refer to dirt levels, particle levels, performance levels, clogged levels, path-obstruction levels, light conditions, line-of-sight conditions, and so forth.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 4A-B illustrate example dynamically adjustment systems;

FIG. 5 illustrates an exemplary detector module; and

FIG. 6 illustrates an exemplary method embodiment.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

The present disclosure provides a way to dynamically adjust sensors and compactions in electrically-powered trash compactors and receptacles. A system, method and computer-readable media are disclosed which dynamically adjust sensors and compactions in electrically-powered trash compactors and receptacles. A brief introductory description of a basic general purpose system or computing device in FIG. 1, which can be employed to practice the concepts, is disclosed herein. A more detailed description and variations of electrically-powered receptacles, as well as systems for dynamically adjustment sensors and compactions will then follow. These variations shall be described herein as the various embodiments are set forth. The disclosure now turns to FIG. 1.

Figure 1:
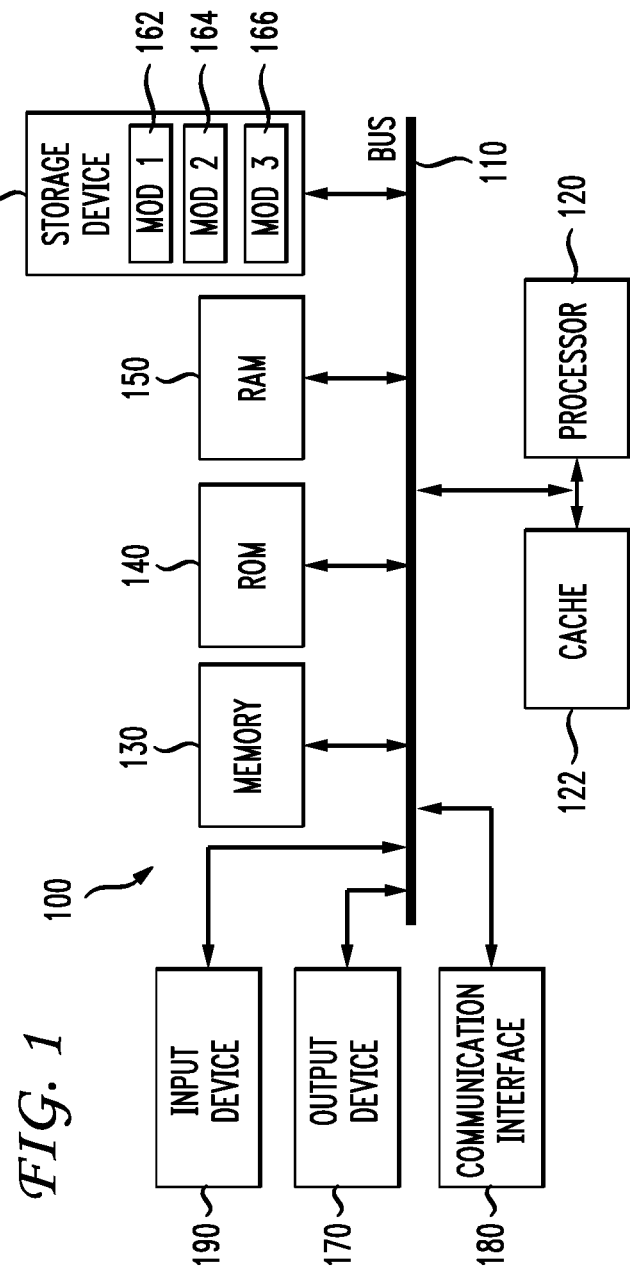
FIG. 1 illustrates an example system embodiment.

With reference to FIG. 1, an exemplary system and/or computing device 100 includes a processing unit (CPU or processor) 120 and a system bus 110 that couples various system components including the system memory 130 such as read only memory (ROM) 140 and random access memory (RAM) 150 to the processor 120. The system 100 can include a cache 122 of high-speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various operations or actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the processor. The processor 120 may be a self-contained computing system, containing multiple cores or processors, a bus, memory controller, cache, etc. A multi-core processor may be symmetric or asymmetric. The processor 120 can include multiple processors, such as a system having multiple, physically separate processors in different sockets, or a system having multiple processor cores on a single physical chip. Similarly, the processor 120 can include multiple distributed processors located in multiple separate computing devices, but working together such as via a communications network. Multiple processors or processor cores can share resources such as memory 130 or the cache 122, or can operate using independent resources. The processor 120 can include one or more of a state machine, an application specific integrated circuit (ASIC), or a programmable gate array (PGA) including a field PGA.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 160 can include software modules 162, 164, 166 for controlling the processor 120. The system 100 can include other hardware or software modules. The storage device 160 is connected to the system bus 110 by a drive interface. The drives and the associated computer-readable storage devices provide nonvolatile storage of computer-readable instructions, data structures, program modules and other data for the computing device 100. In one aspect, a hardware module that performs a particular function includes the software component stored in a tangible computer-readable storage device in connection with the necessary hardware components, such as the processor 120, bus 110, display 170, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 100 is a small, handheld computing device, a desktop computer, or a computer server. When the processor 120 executes instructions to perform "operations", the processor 120 can perform the operations directly and/or facilitate, direct, or cooperate with another device or component to perform the operations.

Although the exemplary embodiment(s) described herein employs the hard disk 160, other types of computer-readable storage devices which can store data that are accessible by a computer, such as magnetic cassettes, flash memory cards, digital versatile disks (DVDs), cartridges, random access memories (RAMs) 150, read only memory (ROM) 140, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage devices. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

One or more parts of the example computing device 100, up to and including the entire computing device 100, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 120 can include all types of processors disclosed herein, including a virtual processor. However, when referring to a virtual processor, the processor 120 includes the software components associated with executing the virtual processor in a virtualization layer and underlying hardware necessary to execute the virtualization layer. The system 100 can include a physical or virtual processor 120 that receive instructions stored in a computer-readable storage device, which cause the processor 120 to perform certain operations. When referring to a virtual processor 120, the system also includes the underlying physical hardware executing the virtual processor 120.

Figure 2:
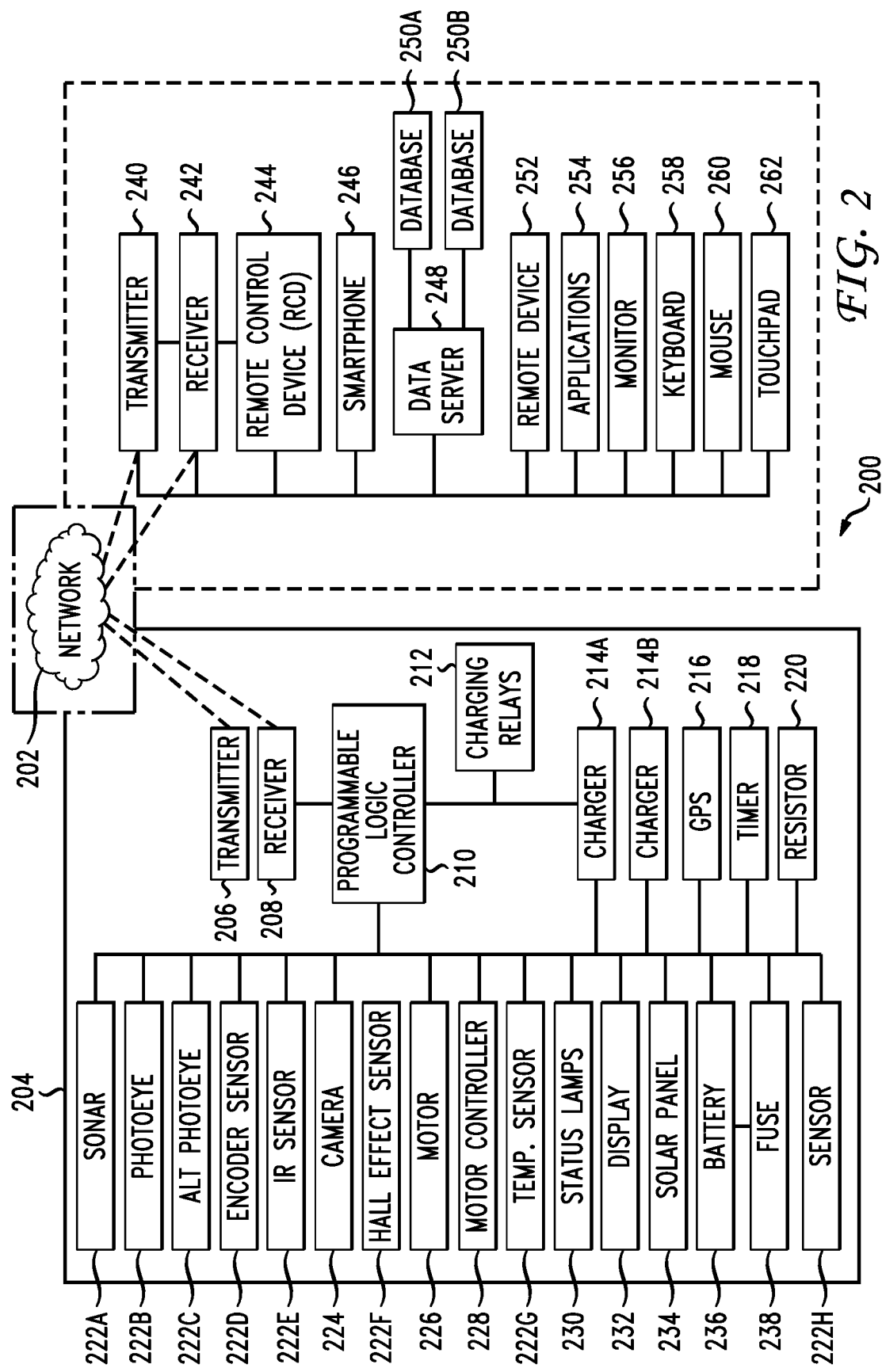
FIG. 2 illustrates an example architecture for remotely controlling electrically-powered compactors.

Having disclosed some components of a computing system, the disclosure now turns to FIG. 2, which illustrates an exemplary architecture for controlling electrically-powered compactors both locally and remotely via a network. Receptacle 204 can be an electrically-powered receptacle for collecting waste, such as trash and recyclables, for example Receptacle 204 can be, for example, a solar or battery-powered receptacle and/or compactor. Moreover, receptacle 204 can include a motor 226 for performing various operations, such as compaction operations. Not shown in the figures is the actual structure for compaction. However, in general, the system in FIG. 2 will include control to utilize power in the batter 236 to run a motor 226 that performs compaction on the trash within a bin inside the receptacle. Further, receptacle 204 can be remotely controlled via remote control device (RCD) 244. To this end, receptacle 204 can include transmitter 206 and receiver 208 for communicating with RCD 244. In particular, transmitter 206 and receiver 208 can communicate with transmitter 240 and receiver 242 on RCD 244, and vice versa. Here, transmitters 206 and 240 can transmit information, and receivers 208 and 242 can receive information. This way, receptacle 204 and RCD 244 can be connected to transmit and receive information, such as instructions, commands, statistics, alerts, notifications, files, software, data, and so forth. Receptacle 204 can also communicate with other devices, such as a server and/or a collection vehicle, via transmitter 206 and receiver 208. Similarly, RCD 244 can communicate with other devices, such as a server and/or a user device 246, 252, via transmitter 240 and receiver 242.

Moreover, receptacle 204 and RCD 244 can communicate with each other and/or other devices via network 202. The network 202 can include a public network, such as the Internet, but can also include a private or quasi-private network, such as an intranet, a home network, a virtual private network (VPN), a shared collaboration network between separate entities, etc. Indeed, the network 202 can include many types of networks, such as local area networks (LANs), virtual LANs (VLANs), corporate networks, wide area networks, a cell phone transmitter and receiver, a WiFi network, a Bluetooth network, and virtually any other form of network.

Transmitter 206 and receiver 208 can be connected to printed circuit board (PCB) 210, which controls various functions on receptacle 204. In some embodiments, the RCD 244 can be incorporated within the PCB 210. In FIG. 2, the RCD 244 is electrically connected to the PCB 210 via transmitters 206, 240 and receivers 208, 242. The RCD 244 can be connected to transmitter 240 and receiver 242 via a two-way communication port, which includes transmitter 240 and receiver 242. The PCB 210 can control electrical functions performed by the receptacle 204. Electrical functions can include, for example, running compactions by actuating a motor 226; sensing waste or recyclables volume inside the receptacle 204 using a sensor at regular or programmable intervals, such as a sonar-based sensor 222A, a proximity sensor, and/or photoeye sensors 222B-C; changing status lamps 230 at regular and/or programmable thresholds to/from a color indicating that the receptacle 204 is not full (e.g., green), to/from a color indicating that the receptacle 204 is almost full (e.g., yellow), to/from a color indicating that the receptacle 204 is full (e.g., red); etc.

The RCD 244 can enable remote control and/or alteration of the functions performed or operated by the PCB 210. The RCD 244 can also provide access to, and control over, the various components 206, 208, 210, 212, 214A-B, 216, 218, 220, 222A-H, 224, 226, 228, 230, 232, 234, 236, 238 of the receptacle 204. Users can use a networked device, such as smartphone 246 and/or remote device 252, to communicate with the RCD 244 in order to manage and/or control the receptacle 204. For example, a user can communicate with the RCD 244 via the remote device 252 to change a threshold value on the PCB 210, which can control, for example, a collection timing; the compaction motor 226; the use of energy on a lighted advertising display, such as display 232; the status lamps 230; the sensors 222A-G; the camera 224; etc. The remote device 252 can include virtually any device with networking capabilities, such as a laptop, a portable media player, a tablet computer, a gaming system, a smartphone, a global positioning system (GPS), a smart television, a desktop, etc. In some embodiments, the remote device 252 can also be in other forms, such as a watch, imaging eyeglasses, an earpiece, etc.

The remote device 252 and RCD 204 can be configured to automatically modify the PCB's 210 operating parameters. However, users can also manually modify the PCB's 210 operating parameters via the remote device 252 and RCD 204. The operating parameters can be modified in response to, for example, evolving industry benchmarks; user inputs; historical data, such as the data gathered from a separate database 250A-B; forecasted data, such as upcoming weather characteristics; traffic conditions; a collection schedule; a collection route; a proximity of a collection vehicle; a time and/or date; a location; a capacity, such as a capacity of the receptacle 204 and/or a capacity of a collection vehicle; a fullness state of the receptacle 204; lapsed time between collections; lapsed time between compactions; usage conditions of the receptacle 204; energy usage; battery conditions; statistics; a policy; regulations; a detected movement of an object, such as an object inside or outside of the receptacle 204; collection trends; industry and/or geographical standards; zoning policies and characteristics; real-time information; user preferences; and other data. The data from the remote device 252 can be relayed to the RCD 244, and the data from the RCD 244 can be relayed, via the network 202, to the receptacle 204 and/or the remote device 252 for presentation to the user.

The user can control the RCD 244 and/or access and modify information on the RCD 244 via a user interface, such as a web page, an application 254, a monitor 256, and/or via voice messages and commands, text messages, etc. The remote device 252 can include a user interface, which can display, for example, graphs of collection statistics and trends (e.g., collection frequency, usage, temperature, etc.), collection reports, device settings, collection schedules, collection configurations, historical data, status information, collection policies, configuration options, device information, collection routes and information, alerts, etc. This way, users can access information to make educated decisions about how to set and/or reset operating parameters on the PCB 210; to control, for example, which sensors are used to gather data, which thresholds to set; to control outputs from the status lamps 230 and other components; etc. User can change settings on the receptacle 204, such as optimal collection timing, timing of sensor actuation; and/or modify parameters, such as desired capacity and fullness thresholds; using a scroll down menu, click-and-slide tools, interactive maps displayed on the remote device 252, touch screens, forms, icons, text entries, audio inputs, text inputs, etc. In response, the RCD 244 can automatically reconfigure the PCB 210 settings, recalibrate sensors and displays, change operating parameters, etc.

The RCD 244 can include a two-way communication port that includes transmitter 240 and receiver 242, which can wirelessly communicate with the PCB 210 of the receptacle 204, via the transmitter 206 and receiver 208 on the receptacle 204, which are connected electrically to the PCB 210. On scheduled and/or programmable intervals, the PCB's 210 transmitter 206 can send data to a central server, such as data server 248, via the network 202. Moreover, the RCD's 244 receiver 242 can be configured to query the data server 248, which can also be connected to the remote device 252, for incoming data. The data server 248 can communicate data from databases 250A-B. If there is no data to be received by the receiver 208, the PCB 210 can be configured to promptly return to a low-power mode, where the transmitter 206 and receiver 208 circuits are turned off, until another scheduled, received, initiated, and/or programmed communication event. If there is data to be received by the receiver 208, such as a command to turn the receptacle 204 off and then back on, a command to change the thresholds upon which compactions are operated, a command to change the thresholds for providing status updates and/or determining fullness states, etc., then the RCD receiver 242 can download the new data from the data server 248, via the RCD 244, to the PCB 210, altering its operating configuration. The RCD receiver 242 can also be configured to send data to the data server 248 to acknowledge the receipt of data from the PCB 210, and to send selected data to the remote device 252, the smartphone 246, and/or any other device, for presentation to a user.

The data server 248 can also display the data to a user on remote device 252, smartphone 246, or any other device. The data can be a password-protected web page, a display on the smartphone 246, a display on the monitor 256, etc. Remote control using the RCD 244 to reconfigure operating thresholds, sensor use, sensor hierarchy, energy usage, etc., can enable the receptacle 204 to alter characteristics that control its energy generation, energy consumption, and/or the collection and management logistics, further enabling sound operation of the receptacle 204.

The RCD 244 can be configured to communicate over a wireless network with the PCB 210, and transmit data to the data server 248, so the data can be stored for viewing and manipulation by a user via any web-connected computer, phone, or device. The RCD 244 can also be configured to receive data from the data server 248, and transmit the data back to the PCB 210. The PCB 210 can be electrically connected to a variety of sensors, such as sensors 222A-H, within the receptacle 204. Through the RCD 244, the PCB 210 can also be wirelessly connected to the databases 250A-B, and/or other external databases, such as a weather database, which may, for example, reside on a National Oceanographic and Atmospheric (NOAA) server, a database of trucks and locations and schedules, which may reside on a waste hauler's server, a database of traffic conditions, etc. A user can also change which of the sensors 222A-H are used in setting thresholds, among other things, in response to, for example, user commands and/or changes in outside data, such as weather data or truck location data.

The PCB 210 can also communicate with a temperature sensor 222G to gather temperature information, which can be transmitted to the RCD 244 via the PCB transmitter 206. The temperature information can be used, among other things, to fine tune operational functions and energy consumption of the receptacle 204. For example, the PCB 210 can be reconfigured to run less compaction per day, such as four to eight compactions, in cold weather, since batteries are less powerful in cold weather. Coinciding with cold weather, the winter days are shorter, thus solar energy and battery power is limited. In order to conserve power on low-sunlight days, the RCD 244 can adjust the PCB's 210 normal fullness sensitivity levels, so that collections are prompted to be made earlier. For example, if the PCB 210 typically runs 20 compactions before changing status lamps from green to yellow, a signal that suggests optimal collection time, the RCD 244 can adjust the thresholds of the PCB 210 to run 10 compactions before changing from a green state to a yellow state, thus changing the total energy consumption of the compactor between collections. In a busy location, the PCB 210 can be configured to sense receptacle fullness every minute, whereas in a less busy location, the PCB 210 can be configured to sense fullness once a day.

In some embodiments, the RCD 244 can also alter the timing of events using algorithms based on the results of historical events. For example, the RCD 244 can be initially configured to sense fullness once per minute, but based on resulting readings, it can then alter the timing of future readings. Thus, if three consecutive readings taken at one-minute intervals yield a result of no trash accumulation, the RCD 244 can increase the timing between readings to two minutes, then three minutes, etc., based on the various readings. The RCD 244 can also be configured to adjust sensing intervals based on the level of fullness of the receptacle 204, so it would sense more frequently as the receptacle 204 fills, in order to reduce the margin of error at a critical time, before the receptacle 204 overflows. This "learning feature" can save energy by ultimately synchronizing the sensor readings with actual need to sense. The RCD 244 can also alter thresholds of status lamps 230 based on collection history, the need for capacity as determined by the frequency of red or yellow lights on the receptacle 204, temperatures, expected weather and light conditions, expected usage conditions, etc. The status lamps 230 can be LED lights, for example.

In FIG. 2, the RCD 244 can be enabled, via the PCB 210, to read, for example, a temperature sensor 222G; an encoder sensor 222D, which can measure movement of a compaction ram by utilizing an "encoder wheel" which is mounted on a motor shaft; one or more photoeye sensors 222B-C; door sensors; a sensor which measures current from the solar panel and a sensor which can measure current from the battery 236 to the motor 226; a hall effect sensor 222F, which can detect movement of, for example, a door; an infrared (IR) sensor 222E, a camera 224, etc. In addition, the thresholds set by the RCD 244 can be based on historical and real-time information, user preferences, industry norms, weather patterns and forecasts, and other information. The RCD 244 can reset the PCB's 210 normal thresholds hourly, daily, weekly, monthly, yearly, or at adjustable intervals, based on a variety of information and user decisions.

The RCD 244 can also alter the PCB's 210 normal hierarchy of sensor usage. For example, if the PCB 210 is configured to run a compaction cycle when one or more of the photoeyes 222B-C located inside the receptacle 204 are blocked, the RCD 244 can reconfigure the sensor hierarchy by reconfiguring the PCB 210 to run compaction cycles after a certain amount of time has passed, by reading the position of the encoder sensor 222D at the end of a cycle, by reading one or more photoeye sensors 222B-C, by calculating a sensor hierarchy based on historical filling rates, by a change in user preferences, etc. Using an aggregate of data from other receptacles located worldwide in a variety of settings, the RCD's 244 configurations can depend on constantly evolving parameters for optimizing energy utilization, capacity optimization, and operational behavior, among other things. The RCD 244 innovation and growing database of benchmarks, best practices and solutions to inefficiency, enables the receptacle 204 to adapt and evolve.

Based on the data from the PCB 210, the sensors, inputs by the users (e.g., the customer or the manufacturer) via the RCD 244, and/or based on other data, such as historical or weather data, the RCD 244 can change the PCB 210 thresholds, operational parameters, and/or configuration, to improve the performance of the receptacle 204 in different geographies or seasons, or based on different user characteristics or changing parameters. Thus, the system and architecture can be self-healing.

The RCD 244 can also be configured to change the PCB's 210 normal operating parameters. For example, the RCD 244 can be configured to cause the PCB 210 to run multiple compaction cycles in a row, to run energy through a resistor 220 to apply a strong load upon the battery 236, which can supply the energy. The RCD 244 can measure battery voltage at predetermined or programmable intervals, to measure the "rebound" of the battery 236. A strong battery will gain voltage quickly (e.g., the battery will almost fully recover within 15 minutes or so). A weak battery will drop significantly in voltage (e.g., 3-5 volts), will recover slowly, or will not recover to a substantial portion of its original voltage. By changing the normal parameters of the PCB 210, the battery 236 can be subjected to a heavy load during a test period, which will determine the battery's strength without jeopardizing operations. The RCD 244 can then be configured to relay a message to the user that a battery is needed, or to use the battery differently, for example, by spacing out compactions in time, reducing the degree of voltage decline within a certain time period, etc. Based on the message and any additional information from the RCD 244, the user can then order a new battery by simply clicking on a button on a web page, for example. The RCD 244 can also alter the PCB 210 to do more compactions or other energy-using functions (like downloading software) during the daytime, when solar energy is available to replenish the battery 236 as it uses energy.

Since the RCD 244 can be connected to databases, and can be informed by the PCB 210 on each receptacle of conditions or status information at the respective receptacle, the RCD 244 can also be used to relay data collected from the databases or PCB 210 for other types of servicing events. In other words, the RCD 244 can obtain, collect, maintain, or analyze status, operating, or conditions information received from the PCB 210 of one or more receptacles and/or one or more databases storing such information, and relay such data to a separate or remote device, such as a remote server or control center. For example, the RCD 244 can be configured to relay a message to a waste hauler to collect the receptacle 204 if two or more parameters are met simultaneously. To illustrate, the RCD 244 can relay a message to a waste hauler to collect the receptacle 204 if the receptacle 204 is over 70% full and a collection truck is within 1 mile of the receptacle 204. The RCD 244 can then send a message to the remote device 252 to alert a user that a collection had been made, and the cost of the collection will be billed to the user's account.

In addition, the RCD 244 can change the circuitry between the solar panel 234 and the battery 236, so that solar strength can be measured and an optimal charging configuration can be selected. The charging circuitry 214A-B is illustrated as two circuitries; however, one of ordinary skill in the art will readily recognize that some embodiments can include more or less circuitries. Charging circuits 214A-B can be designed to be optimized for low light or bright light, and can be switched by the RCD 244 based on programmable or pre-determined thresholds. Also, while solar information can be readily available (e.g., Farmers' Almanac), solar energy at a particular location can vary widely based on the characteristics of the site. For example, light will be weaker if reflected off a black building, and if the building is tall, blocking refracted light. For this reason, it can be useful to measure solar energy on site, as it can be an accurate determinant of actual energy availability at a particular location. To do this, the battery 236 and solar panel 234 can be decoupled using one or more charging relays 212. In other aspects, a very high load can be placed on the battery 236 to diminish its voltage, so that all available current from the solar panel 234 flows through a measureable point. This can be done, for example, by causing the receptacle 204 to run compaction cycles, or by routing electricity through a resistor, or both.

There are a variety of other methods which can be used to create a load. However, putting a load on the battery 236 can cause permanent damage. Thus, the RCD 244 can also be configured to disconnect the battery 236 from the solar panel 234, instead routing electricity through a resistor 220. This can allow for an accurate measurement of solar intensity at a particular location, without depleting the battery 236, which can help assess the potential for running compactions, communicating, powering illuminated advertisements, and powering other operations. In some embodiments, the PCB 210 can be reconfigured by the RCD 244 to run continuous compaction cycles for a period of time, measure solar panel charging current, relay the data, and then resume normal operations. Different configurations or combinations of circuits can be used to test solar intensity, battery state or lifecycle, and/or predict solar or battery conditions in the future.

The RCD 244 can also track voltage or light conditions for a period of days, and alter the state of load and charging based on constantly changing input data. For example, the RCD 244 can configure the timer 218 of the PCB 210 to turn on the display 232 for advertising for a number of days in a row, starting at a specific time and ending at another specific time. However, if the battery voltage declines over this period of time, the RCD 244 can then reduce the time of the load (the display 232) to every other day, and/or may shorten the time period of the load each day. Further, the RCD 244 can collect information on usage and weather patterns and reconfigure the PCB's 210 normal operating regimen to increase or reduce the load (for example, the advertisement on the display 232) placed on the battery 236, based on the information collected. For example, if it is a Saturday, and expected to be a busy shopping day, the RCD 244 can allow a declining state of the battery 236, and can schedule a period on the near future where a smaller load will be placed on the battery 236, by, for example, not running the advertisement on the coming Monday. In doing so, the RCD 244 can optimize the advertising value and energy availability to use energy when it is most valuable, and recharge (use less energy) when it is less valuable. In order to maximize solar energy gained from a variety of locations, the RCD 244 can cause the PCB 210 to select between one of several charging circuits. For example, if it is anticipated that cloudy conditions are imminent, the RCD 244 can change the circuit that is used for battery charging, in order to make the charger more sensitive to lower light conditions. In a sunny environment, the charger circuit used can be one with poor low-light sensitivity, which would yield more wattage in direct sunlight.

The architecture 200 can also be used for monitoring functions, which can enable users to access information about the receptacle 204 and collection process. With this information, users can make judgments that facilitate their decision-making, helping them remotely adjust settings on the receptacle 204 to improve performance and communication. For example, the RCD 244 can be configured to enable users to easily adjust callback time, which is the normal time interval for communication that is configured in the PCB 210. The RCD 244 can enable the user to alter this time setting, so that the receptacle 204 communicates at shorter or longer intervals. Once the PCB 210 initiates communication, other parameters can be reconfigured, such as awake time, which is the amount of time the receiver is in receiving mode. This enables users to make "on the fly" changes. In some cases, the PCB 210 can shut down after sending a message and listening for messages to be received. In these cases, it can be difficult to send instructions, wait for a response, send more instructions and wait for response, because the time lapse between normal communications can be a full day. However, by remotely adjusting the setting through the RCD 244, the user can make continuous adjustments while testing out the downloaded parameters in real time, and/or close to real time. This can enhance the ability of the user to remotely control the receptacle 204.

Further, the RCD 244 can alter the current of the photoeyes 222B-C, in a test to determine whether there is dirt or grime covering the lens. Here, the RCD 244 can reconfigure the normal operating current of the photoeyes 222B-C. If the lens is dirty, the signal emitter photoeye will send and the signal receiver will receive a signal on high power, but not on low power. In this way, a service call can be avoided or delayed by changing the normal operating current to the photoeyes 222B-C. This can be a useful diagnostic tool.

In some embodiments, regular maintenance intervals can be scheduled, but can also be altered via information from the RCD 244. The RCD 244 can be configured to run a cycle while testing motor current. If motor current deviates from a normal range (i.e., 2 amps or so), then a maintenance technician can be scheduled earlier than normal. The RCD 244 can send a message to the user by posting an alert on the users web page associated with the receptacle 204.

Other settings can be embodied in the receptacle 204 as well. For example, the PCB 210 can sense that the receptacle 204 is full. The RCD 244 can then configure the PCB 210 to have a web page, or another display, present a full signal. The RCD 244 can alter when the full signal should be presented to the user. For example, after accessing a database with historical collection intervals, the RCD 244 can reconfigure the PCB 210 to wait for a period of time, e.g., one hour, before displaying a full signal at the web page. This can be helpful because, in some cases, a "false positive" full signal can be signaled by the PCB 210, but this can be avoided based on historical information that indicates that a collection only a few minutes after the last collection would be highly aberrational. The RCD 244 can thus be configured to override data from the PCB 210. Instead of sending a full signal to the user, the RCD 244 reconfigures the PCB 210 to ignore the full signal temporarily, and delay the display of a full-signal on the users' web page or smart phone, in order for time to go by and additional information to be gathered about the receptacle's actual fullness status. For example, when a collection is made and ten minutes later, the fullness sensor detects the receptacle 204 is full, the fullness display message on the web page can be prevented from displaying a full status. In some cases, the bag can be full of air, causing the proximity sensor in the receptacle 204 to detect a full bin. Within a certain time period, e.g., twenty minutes in a busy location, a few hours in a less busy location, as determined based on the historical waste generation rate at the site, the bag can lose its air, and the proximity sensor can sense that the bin is less full than it was twenty minutes prior, which would not be the case if the bin was full with trash instead of air. Thus, "false positive" information can be filtered out.

Likewise, tests and checks can be performed so that false negative information is avoided as well. For example, if a bin regularly fills up daily, and there is no message that it is full after two or three days, an alert can appear on the users' web page indicating an aberration. Thresholds for normal operating parameters and adjustments to normal can be set or reset using the RCD 244, or they can be programmed to evolve through pattern recognition. Although many operating parameter adjustments can be made through the web portal, adjustments can also be made automatically. This can be controlled by a software program that aggregates data and uses patterns in an aggregate of enclosures to alter PCB 210 settings on a single enclosure. For example, if the collection data from 1,000 enclosures indicates that collection personnel collect from bins too early 50% of the time when compaction threshold setting is set to "high", compared to 10% of the time when compaction settings are set at "medium," then the RCD 244 can reprogram the compaction thresholds to the medium setting automatically, so that collection personnel can be managed better, limiting the amount of enclosures that are collected prematurely. Automatic reprogramming, governed by software programs, can be applied to other aspects, such as user response to dynamic elements of the receptacle 204, such as lighted or interactive advertising media displayed on the receptacle 204. For example, if users respond to an LCD-displayed advertisement shown on the receptacle 204 for "discounted local coffee" 80% of the time, the RCD 244 can configure all receptacles within a certain distance, from participating coffee shops, to display the message: "discounted local coffee."

In some embodiments, the RCD 244 can include a data receiving portal for the user with information displays about an aggregate of receptacles. Here, the user can access real-time and historical information of, for example, receptacles on a route, and/or receptacles in a given geography. The data can be displayed for the user on a password-protected web page associated with the aggregate of receptacles within a user group. The receptacle 204 can also display, for example, bin fullness, collections made, the time of collections, battery voltage, motor current, number and time of compaction cycles run, graphs and charts, lists and maps, etc. This data can be viewed in different segments of time and geography in order to assess receptacle and/or fleet status, usage, and/or trends. The users' web page can show, for example, a pie chart showing percentage of bins collected when their LED was blinking yellow, red and green, or a histogram showing these percentages as a function of time. These statistics can be categorized using pull down menus and single-click features. A single click map feature, for example, is where summary data for a particular receptacle is displayed after the user clicks on a dot displayed on a map which represents that receptacle. This can allow the user to easily view and interact with a visual map in an external application.

The RCD 244 can be configured to display calculated data, such as "collection efficiency," which is a comparison of collections made to collections required, as measured by the utilized capacity of the receptacle 204 divided by the total capacity of the receptacle 204 (Collection Efficiency=utilized capacity/total capacity). The user can use this information to increase or decrease collections, increase or decrease the aggregate capacity across an area, etc. Typically, the users' goal is to collect the receptacle 204 when it is full—not before or after. The user can click buttons on their web page to show historical trends, such as collection efficiency over time, vehicle costs, a comparison of vehicle usage in one time period versus vehicle usage in another time period, diversion rates, a comparison of material quantity deposited in a recycling bin versus the quantity of material deposited into a trash bin. Other statistics can be automatically generated and can include carbon dioxide emissions from trucks, which can be highly correlated to vehicle usage. Labor hours can also be highly correlated with vehicle usage, so the web page can display a labor cost statistic automatically using information generated from the vehicle usage monitor. As the user clicks on buttons or otherwise makes commands in their web portal, the RCD 244 can change the PCB's 210 operating parameters, usage of sensors, etc., and/or measurement thresholds in response. The RCD 244 can also be configured to automatically display suggested alterations to the fleet, such as suggestions to move receptacles to a new position, to increase or decrease the quantity of receptacles in a given area, to recommend a new size receptacle based on its programmed thresholds, resulting in an improvement in costs to service the fleet of receptacles.

Heat mapping can also be used to provide a graphical representation of data for a user. Heat mapping can show the user the level of capacity in each part of an area, for example a city block, or it can be used to show collection frequency in an area. In each case, the heat map can be generated by associating different colors with different values of data in a cross sectional, comparative data set, including data from a plurality of enclosures. The heat map can be a graphical representation of comparative data sets. In some embodiments, red can be associated with a high number of a given characteristic, and "cooler" colors, like orange, yellow and blue, can be used to depict areas with less of a given characteristic. For example, a heat map showing collection frequency or compaction frequency across 500 receptacles can be useful to determine areas where capacity is lacking in the aggregate of enclosures—a relative measure of capacity. In this case, the highest frequency receptacle can assigned a value of red. Each number can be assigned progressively cooler colors. In other embodiments, the red value can be associated with a deviation from the average or median, for example, a darker red for each standard deviation. The heat maps can be shown as a visual aid on the user's web page, and can color-code regions where "bottlenecks" restrict vehicle and labor efficiency. A small red region can show graphically, for example, that if the user were to replace only ten receptacles with higher-capacity compactors, the collection frequency to a larger area could be reduced, saving travel time. Heat maps can be a helpful visual tool for showing data including, but not limited to, data showing "most collections" in a given time period, "most green collections," which can visually demonstrate the number of bins collected too early (before they are actually full), "most compactions," which can show on a more granular level the usage level of the bin, "most uses," which can represent how many times the insertion door of the bin is opened or utilized, "most alerts," which can show visually the number of "door open alerts," which can show when doors were not closed properly, "voltage alerts," which can show visually which receptacles are of low power, etc. While specific measurements are described herein to demonstrate the usefulness of heat mapping, there are other sets of data that can be represented by the heat maps, which are within the scope and spirit of this invention.

The heat map can also be used to present a population density in one or more areas, as well as a representation of any other activity or characteristic of the area, such as current traffic or congestion, for example. This information can also be shared with other businesses or devices. For example, the RCD 244 can analyze the heat map and share population statistics or activity with nearby businesses or municipalities. The RCD 244 can, for example, determine a high population density in Area A on Saturday mornings and transmit that information to a nearby locale to help the nearby locale prepare for the additional activity. As another example, if the receptacle is placed in a park, the RCD 244 can determine population and activity levels at specific times and alert park officials of the expected high levels of activity so the park officials and/or those managing the receptacle can plan accordingly.

The RCD 244 can also be used for dynamic vehicle routing and compaction and/or receptacle management. Because the RCD 244 can be a two-way communicator, it can both send and receive information between various receptacles and databases. This can allow the user to cross-correlate data between the fleet of receptacles and the fleet of collection vehicles. The RCD 244 can receive data from the user and/or the user's vehicle. For example, the RCD 244 can receive GPS data or availability data, and use it to change parameters on a given receptacle or aggregate of receptacles. The RCD 244 can receive this data from the users' GPS-enabled smartphone, for example. Similarly, the RCD 244 can send data to the user, a user device, a smartphone, etc., about the status of the receptacle 204. With this two-way data stream, collection optimization can be calculated in real time or close to real time. For example, a collection truck is traveling to the east side of a city and has 30 minutes of spare time. The RCD 244 can receive information about the truck's whereabouts, availability and direction, and query a database for receptacle real time and historical fullness information and determine that the truck can accommodate collections of twenty receptacle locations. The RCD 244 can then display a list of twenty receptacle locations that the truck can accommodate. The user can view a map of the twenty recommended locations, see a list of driving directions, etc. The map of driving directions can be optimized by adding other input data, such as traffic lights, traffic conditions, average speed along each route, etc. At the same time, as the truck heads to the east side of the city, the RCD 244 can reconfigure receptacles on the west side to change compaction thresholds, so that capacity is temporarily increased, freeing up additional time for the truck to spend in the east section. Alternatively, the RCD 244 can reconfigure a receptacle to temporarily display a "full" message to pedestrians, helping them find a nearby receptacle with capacity remaining. The RCD 244 can, in the case where the receptacle requires payment, increase pricing to the almost-full receptacle, reducing demand by pedestrians or other users. This same logic can be effective in situations where trucks are not used, for example, indoors at a mall or airport. The demand for waste capacity can vary, so having remote control over the receptacle 204 can allow users to change settings, parameters, and/or prices to make the collection of waste dynamic and efficient.

The location of the receptacle 204 and other receptacles can be determined via triangulation and/or GPS, for example, and placed on a map in the interactive mapping features. Moreover, the location of an indoor receptacle can be obtained from indoor WiFi hot spots, and the indoor receptacle can be placed on a map in the interactive mapping features. As a staff member accomplishes tasks (i.e., cleaning a bathroom) and moves inside a facility, the staff member's location can be tracked, and the fullness and location of nearby receptacles can be plotted on a map or given to the staff member by other means, as instructions to add a collection activity to the list of tasks. Whether by GPS, Wifi, Bluetooth, etc., triangulation between communication nodes can serve to locate a receptacle on a map, and measurements of fullness of receptacles can be used to create work instructions for staff members or truck drivers, so that efficient routes and schedules can be created to save time.

To better manage the collection process, user groups can be separated between trash and recycling personnel. In many cities, there are separate trucks used to collect separate streams of waste, such as trash and recyclables. For this reason, it can be helpful to configure the user's web page to display data based on a waste stream. The data can also be divided in this fashion and displayed differently on a smartphone, hand-held computer, and/or other user device. In addition, data can be displayed differently to different users. For example, the manager of an operation can have "administrative privileges," and thus can change the location of a particular receptacle in the system, view collection efficiency of a particular waste collector, view login history, and/or view industry or subgroup benchmarks, while a waste collector with lower privileges can only view receptacle fullness, for example. The RCD 244 or another device can also be configured to print a list of receptacles to collect next, a list of full or partially full bins, etc. For example, the remote device 252 can be configured to print a list of receptacles to collect in the remaining portion of a route.

Figure 3A:
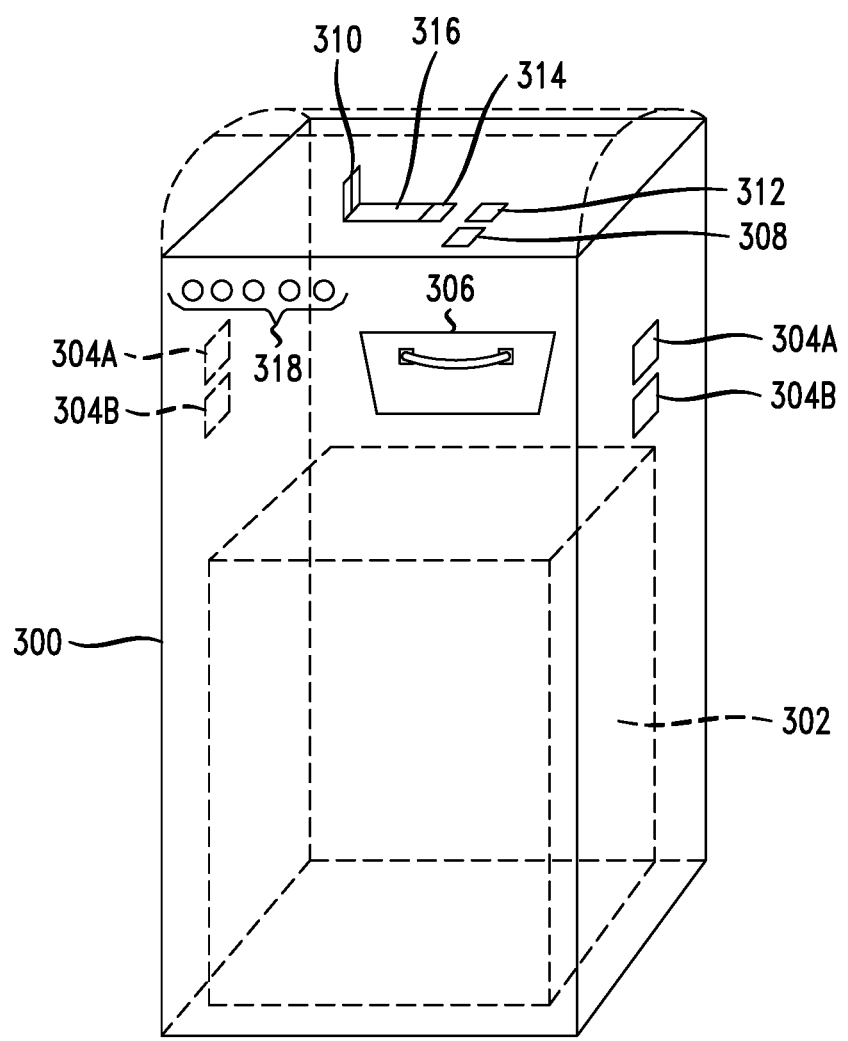
FIGS. 3A-C illustrate an example storage receptacles.
Figure 3B:
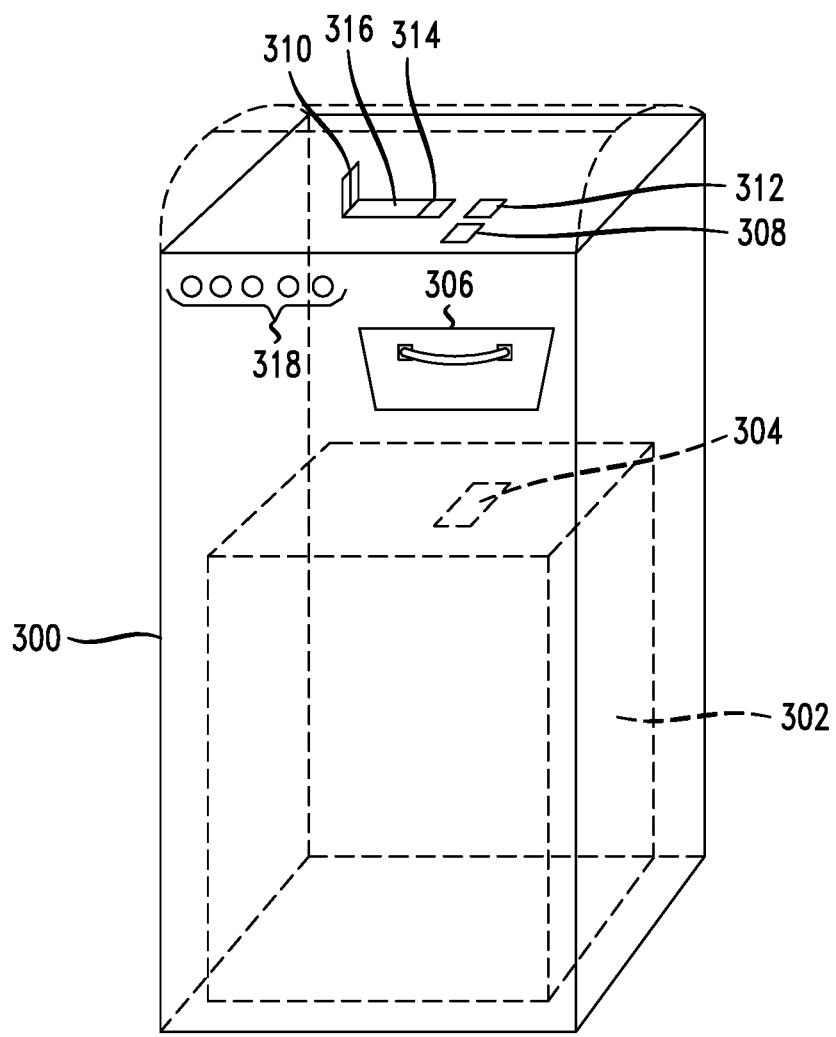
Figure 3C:
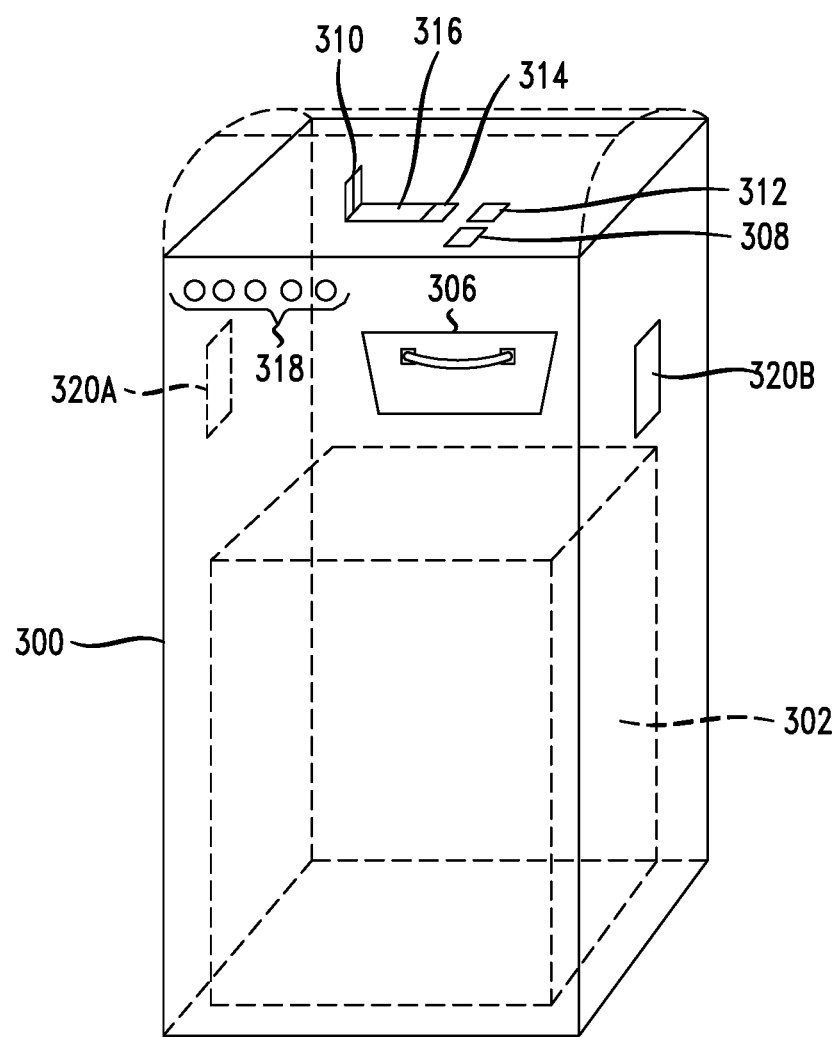

The disclosure now turns to FIGS. 3A-C, which illustrate an exemplary storage receptacle 300. The storage receptacle 300 can be configured to dynamically adjusting sensors and compaction operations, as further described below.

The storage receptacle 300 includes a bin 302 for storing content items, and a door 306 for opening the storage receptacle 300 to throw or deposit items in the bin 302. The storage receptacle 300 can have one or more sensors 304A-B, such as photoeye sensors, placed above the bin 302 for detecting the fullness state of the bin 302. The sensors 304A-B can be positioned in one or more modules attached to the storage receptacle 300 as further described below. In some configurations, the storage receptacle 300 can include two modules, one on each side, and each module can include two or more sensors. Here, the sensors can be placed at different heights in relation to the bin 302. For example, the two modules can each include a lower sensor and a raised sensor. The sensors on each module can be activated and deactivated dynamically based on compaction modes, energy levels, power schemes, operation schemes, etc. For example, the lower sensors can be active when frequent compactions are desired. Since the sensors here are lower in relation to the bin 302, they will detect waste materials more frequently than the raised sensors and thus trigger more frequent compactions. On the other hand, if less frequent compactions are desired, the lower sensors can be automatically deactivated and the raised sensors activated. This way, the lower and raised sensors can be dynamically adjusted and flipped back and forth based on specific conditions, settings, policies, schemes, and so forth.

In addition, each of the sensor modules can include an emitter and receiver. Moreover, the storage receptacle 300 can include compactor software or firmware configured to run self-diagnostics on each of the sensor modules and the normal paths, to ensure the storage receptacle 300 is running properly and to report any errors to the management console.

In some configurations, the storage receptacle 300 can also include a sonar sensor 308 to detect objects in the receptacle 300 and calculate the fullness state of the receptacle 300. As one of ordinary skill in the art will readily recognize, the sonar sensor 308 and sensors 304A-B can also be placed in other locations based on the size and/or capacity of the receptacle 300, storage requirements, storage conditions, preference settings, etc. The signal transmitted and sensed in order to determine trash levels can be any frequency (IR, visual range, etc.) and at any pulse rate. Further, while two upper sensors (304A, 304C) and two lower sensors (304B, 304D) are shown, any number and combination of sensors, transmitters, and receivers could be applied in various places within the receptacle 300. The storage receptacle 300 can also include other types of sensors, such as an infrared sensor, a temperature sensor, a hall effect sensor, an encoder sensor, a motion sensor, a proximity sensor, etc. The sonar sensor 308 and sensors 304A-B can sense fullness at regular intervals, and/or based on manual inputs and/or a pre-programmed schedule, for example. Moreover, the sonar sensor 308 and sensors 304A-B are electrically connected to the printed circuit board (PCB) 316. Further, the sonar sensor 308 and sensors 304A-B can be actuated by the PCB 316, which can be configured to control the various operations of the storage receptacle 300.

The PCB 316 can control electrical functions performed by the storage receptacle 300. The electrical functions controlled by the PCB 316 can include, for example, running compactions by actuating a motor; sensing waste or recyclables volume inside the receptacle 300 using a sensor at regular or programmable intervals, such as sensors 304A-B; changing status lamps 318 at regular and/or programmable thresholds to/from a color indicating that the receptacle 300 is not full (e.g., green), to/from a color indicating that the receptacle 300 is almost full (e.g., yellow), to/from a color indicating that the receptacle 300 is full (e.g., red); collecting data and transmitting the data to another device; receiving data from another device; managing a power mode; measuring and managing a current; performing diagnostics tests; managing a power source; etc. The motor controller 310 can enable voltage to be applied across a load in either direction. The PCB 316 can use the motor controller 310 to enable a DC motor in the receptacle 300 to run forwards and backwards, to speed or slow, to "brake" the motor, etc.

The storage receptacle 300 includes a transmitter 312 and a receiver 314 for sending and receiving data to and from other devices, such as a server or a remote control device. Accordingly, the storage receptacle 300 can transmit and receive information such as instructions, commands, statistics, alerts, notifications, files, software, data, and so forth. The transmitter 312 and receiver 314 can be electrically connected to the PCB 316. This way, the transmitter 312 can transmit data from the PCB 316 to other devices, and the receiver 314 can receive data from other devices and pass the data for use by the PCB 316. In this regard, a user who is checking the status of the receptacle could drive down the street near the device (say within a wireless range, such as Bluetooth or WIFI, for example), not even get out of their vehicle, but receive a signal indicating that all is well, that the trash needs to be emptied, or that a repair or cleaning is needed.

Status lamps 318 can provide an indication of the status of the storage receptacle 300. For example, the status lamps 318 can indicate the fullness state of the storage receptacle 300. To this end, the status lamps 318 can be configured to display a respective color or pattern when the storage receptacle 300 is full, almost full, not full, etc. For example, the status lamps 318 can be configured to flash red when the storage receptacle 300 is full, yellow when the storage receptacle 300 is almost full, and green when the storage receptacle 300 is not full. Moreover, the status lamps 318 can be LED lights, for example.

The status lamps 318 can also be configured to flash in various patterns to indicate various other conditions. For example, the status lamps 318 can be configured to flash at the same time and in combination to show that the receptacle 300 is full. The status lamps 318 can also be configured to flash in different patterns or times or colors to show troubleshooting status information for example. In some cases, the status lamps 318 can be configured to flash in a predetermined manner to show that a door of the receptacle is open, a component is damaged, an obstacle is stuck, an operation is currently active, etc.

As one of ordinary skill in the art will readily recognize, the receptacle 300 can include other components, such as motors, sensors, batteries, solar panels, displays, relays, chargers, GPS devices, timers, fuses, resistors, remote control devices, cameras, etc. However, for the sake of clarity, the receptacle 300 is illustrated without some of these components.

In some configurations, the storage receptacle 300 can be configured to implement dirt sensing technology. The dirt sensing technology can use firmware or other software instructions to monitor the signals, such as infra-red signals, through the sensors on the receptacle 300, and use this data to determine how dirty the detection sensors have become. For example, in some cases, a "clean" sensor 304D can take around 6 38 khz pulses transmitted from a transmitter 304C before the signal is detected. As the sensor becomes more and more, dirty it typically takes longer to detect the signal, and may even take 20 38 khz pulses, for example. This data can be used to provide a scale of how dirty the sensor has become and provide feedback to the user before the sensor becomes completely blocked. Once the sensor is blocked, the capacity of the compactor can be reduced since compactions may no longer performed. As one of ordinary skill in the art will readily recognize, the frequencies and number of pulses discussed herein are provided for non-limiting illustration purposes. In fact, the frequencies used and number of pulses associated with specific dirt levels can vary based on a number of factors, such as hardware and preference settings. Moreover, other applications, frequencies and number of pulses are contemplated herein.

As previously indicated, the receptacle 300 can be configured to operate at a reduced energy usage level. In some cases, the receptacle 300 can also include a prevention mechanism to ensure that the receptacle does not run at zero capacity. Here, the receptacle 300 can be prevented from shutting off completely, and configured to run at least at a threshold level.

Furthermore, since the voltage of a battery does not generally indicate the actual capacity in a battery, it can be beneficial to understand what capacity is available to ensure accurate machine operation and dead battery notification. To this end, the machine firmware can analyze voltage drops that occur after a compaction occurs at what current, and can determine a ratio which can provide feedback and indications of the true battery capacity. The firmware can use this ratio to limit compactions and or notify the management console of the battery state. As previously mentioned, the management console can be a console on the actual storage receptacle 300 and/or a remote device, such as a server, for example.

Referring to FIG. 3B, the storage receptacle 300 can include a reflective portion 304 at the top of the bin 302 and facing towards components 308 and 312. The components 308 and 312 can be a transmitter and a receiver. For example, the component 308 can be a transmitter configured to send a signal to the reflective portion 304. The component 312 can be a receiver configured to receive a signal reflected from the reflective portion 304, which can be originally transmitted by the transmitter, component 308. Thus, the transmitter 308 can send signals down to the reflective portion 304 to be reflected back to the receiver 312. This configuration can be implemented to test a path from the top of the storage receptacle 300 to a top of the bin 302, for example. In some cases, the components 308 and 312 can be situated to test a path between a door on the storage receptacle 300 and the bin 302.

The reflective portion 304 can be a mirror, for example, or any other reflective substance. In some cases, the reflective portion 304 can be at least some of the contents inside the bin 302, which can reflect light or signals. For example, the reflective portion 304 can be trash inside the bin 302.

Referring to FIG. 3C, the storage receptacle 300 can include a reflective portion 320A and a module 320B. The module 320B can include one or more sensors. In some configurations, the module 320B can include a transmitter and a receiver. Here, the transmitter can send a signal to the reflective portion 320A, and the signal can be reflected back to the receiver. In other words, the transmitter in the module 320B can send a signal to a receiver in module 320B by bouncing the signal from the reflective portion 320A. In some cases, the storage receptacle 300 can include additional reflective portions to allow the transmitter and receiver to be placed in different areas and/or positions while still maintaining the capability to communicate a signal between each other by bouncing the signal several times on various portions of reflective material.

FIG. 4A illustrates an exemplary receptacle 400 with adjustable sensor technology. The storage receptacle 400 can include a bin 402 for holding or storing contents, such as waste materials. The storage receptacle also includes modules 404A-B, each of which is attached or secured to an inner wall of the storage receptacle 400 a distance above the bin 402. The modules 404A-B include sensors 406A-D, which are configured to detect various conditions inside the storage receptacle 400, such as fullness levels or dirt levels of the sensors 406A-D. The sensors can include photoeye sensors, infrared sensors, proximity sensors, sonar sensors, motion detectors, etc. In some embodiments, the sensors 406A-D are photoeye sensors. Each of the sensors can also include an emitter and a receiver for sending and receiving signals and beams.

In some configurations, module 404A can include sensors 406A, 406B. Similarly, module 404B can include sensors 406C, 406D. Sensors 406A and 406C can be lower sensors in the sense that they are located at a lower height than sensors 406B and 406D, and are positioned at a closer distance to the bin 402. On the other hand, sensors 406B and 406D can be raised sensors, at least in the sense that they are positioned higher in the modules 404A, 404B and the storage receptacle 400, and thus are further in distance from the bin 402 than sensors 406A and 406C. By including multiple sensors at different heights, the storage receptacle 400 can automatically vary the height of the sensors used to sense materials, waste, dirt levels, and other elements inside the storage receptacle 400. For example, the storage receptacle 400 can activate the lower sensors, sensors 406A and 406C to perform sensing operations while sensors 406B and 406D are deactivated or otherwise not operating as the primary sensors. To modify the operations of the storage receptacle 400, such as the number of compactions, the frequency of compactions, the bin capacity, the power mode, etc.; the storage receptacle 400 can automatically adjust the sensors 406A-D to raise the sensing operations by activating the raised sensors, sensors 406B and 406D, and deactivating the lower sensors, sensors 406A and 406C. In other words, the storage receptacle 400 can automatically flip or switch the lower sensors 406A and 406C to the raised sensors 406B and 406D.

The storage receptacle 400 can dynamically adjust the sensors 406A-D via a processor, for example. The processor can control and dynamically adjust the sensors 406A-D via firmware or other software on a memory or PCB on the storage receptacle 400. The processor can execute instructions to calculate when the sensors should be adjusted, or executed instructions signaled from a remote control device or application. As previously mentioned, by adjusting the height of the active sensors relative to the bin 402, the operations, modes, and functions of the device can be significantly changed. For example, by raising the sensors, the storage receptacle 400 uses less energy, which may be beneficial when lighting is poor in a solar-powered implementation, for example. This is because, for example, the number of compactions performed by the storage receptacle 400 is reduced when the sensors that trigger the compactions are raised, as additional contents or waste materials can be placed in the storage receptacle 400 before the raised sensors detect a need to compact. Alternatively, the lower sensors can be used to run the storage receptacle 400 in a higher capacity mode, which typically runs compactions with greater frequency and thus may result in an increased capacity to hold additional contents.

As previously mentioned, the storage receptacle 400 can automatically adjust the sensors 406A-D. To this end, the modules 404A-B can include an emitter and a receiver to send and receive signals or beams to and from one another in order to detect current conditions at the storage receptacle 400. In some configurations, the emitter and receiver on the modules 404A-B can send the signals or beams through a line-of-sight path. Thus, if a beam sent by an emitter on module 404A is not received by a receiver on module 404B, the software module or firmware on the storage receptacle 400 can detect that the beam was not received and, based on this information, make a determination that there is an obstruction, such as trash contents, in the line-of-sight path. In response, the storage receptacle 400 can then run a compaction to compact the contents causing an obstruction.

In some embodiments, the pulses in the beams transmitted from the emitter on module 406A to the receiver on module 406B can be counted to determine the dirt levels or obstruction state of any of the sensors 406A-D. For example, if there are fewer pulses before the beam is detected, the software module or firmware can determine that the tested sensors are clean or operational. On the other hand, as the number of pulses required before a beam is detected increases, the dirt or obstacle levels on the tested sensors can be deemed to have increasing dirt levels. For example, as a sensor becomes dirtier, it typically takes additional pulses before it can receive or properly send a beam. In some embodiments, the software module or firmware can associate different number of pulses with varying dirt levels.

If the software module or firmware detects dirt levels on a sensor beyond a threshold level, it can automatically deactivate the dirty sensor and activate another sensor on the module. For example, if storage receptacle 400 is using sensors 406A and 406C to detect volume and fullness levels in the storage receptacle 400 but later determines that one or more of the sensors 406A and 406C are dirty beyond a threshold, it can automatically deactivate the dirty sensors 406A and 406C, activate the raised sensors 406B and 406D and continue to use those.

In some cases, each of the modules 404A-B can include an input sensor and an output sensor. For example, in some embodiments, sensor 406A on module 404A can be an output sensor and sensor 406B on module 404A can be an input sensor. Similarly, sensor 406c on module 404B can be an input sensor while sensor 406D on module 404B can be an output sensor. This way, the output sensor 406A and input sensor 406C can be used at times to operate in a lower mode, and input sensor 406B and output sensor 406D can otherwise be used at times to operate in a raised mode. The lower and raised modes can by dynamically and automatically switched, activated, deactivated, flipped, or reversed as previously described. The varying input and output sensors can also be implemented to run self-diagnostics and other tests by modules 404A-B, as further described below in FIG. 4B.

FIG. 4B illustrates an exemplary configuration for running self-diagnostics in a storage receptacle. As previously mentioned, each of the sensor modules 404A-B can include an emitter and a receiver. Accordingly, the software module or firmware on the storage receptacle 400 can run self-diagnostics on each of the sensor modules 404A-B using the emitter and receiver on the particular sensor module tested. For example, an emitter on sensor module 404A can transmit a beam, and the receiver on the module 404A can listen for the beam along signal path 408A. The receiver can then determine if it receives the beam and, if so, how many pulses took to receive the beam. Based on the number of pulses detected before the beam is received by the receiver, the self-diagnostics software can calculate a dirt level of the sensors 406A-B. If the receiver is unable to detect or receive a beam at all, then the self-diagnostics software can determine that the sensors 406A-B are completely dirty, blocked, or clogged. Sensor module 404B can similarly run a self-diagnostic test on each of the sensor modules 404C-D using an emitter and receiver on the particular sensor to send a receive a beam along the signal path 408B.

FIG. 5 illustrates an exemplary detection module 500. The detection module 500 can include lenses 502 coupled to the detection module 500, and a detection board 504 that is coupled to the back of the detection module 500 through connectors 506. The detection module 500 can include an emitter and a receiver for sending and receiving beams or signals. Moreover, the detection module 500 can include an input sensor and an output sensor as previously described. Further, the module 500 can be attached, secured, or coupled to an inner wall of the storage receptacle. Here, the module 500 can be placed a distance above the bin on the storage receptacle. The distance can depend on the size and shape of the bin or the storage receptacle, the operating requirements of the storage receptacle, specific policies or rules, specific conditions, personal preferences, a context, a current environment, an intended use of the storage receptacle, etc.

As previously mentioned, the detection board 504 can be attached, coupled, or secured to the back of the detection module 500. The detection board 504 can be attached, coupled, or secured to the back of the detention module 500 through the holes 506. The detection board 504 can include detection sensors, emitters, receivers, firmware, memory, etc. In some embodiments, the detection board 504 includes an input sensor and an output sensor spaced on different ends of the detection module 500. The detection board 504 can also include a connector 508 to electrically couple the detection board 504 to the receptacle and one or more electrical components in the receptacle, such as a PCB, a memory, a motor, a sensor, a camera, a display, a battery, a wireless transmitter and receiver, etc. The connector 508 can be, for example, a plug, a mating connector, an electrical paddle card, or any other type of electrical connectors.

Having disclosed some basic system components and concepts, the disclosure now turns to the example method embodiment shown in FIG. 6. For the sake of clarity, the method is described in terms of an example receptacle 300, as shown in FIGS. 3A-C, configured to practice the method. The steps outlined herein are illustrative and can be implemented in any combination thereof, including combinations that exclude, add, or modify certain steps.

The receptacle 300 first sends a signal from a transmitter on a first module in the storage receptacle 300 to a receiver on a second module in the storage receptacle 300, wherein the first module is located on a first inner wall of the storage receptacle 300 and the second module is located on a second inner wall of the storage receptacle 300, and wherein at least part of the first module and the second module is located a distance above a bin inside the storage receptacle 300 (600). The first module and the second module can each include one or more sensors. The sensors can include a transmitter and a receiver for sending and receiving signals. In some cases, the signal can be transmitted from a transmitter at a first sensor on the first module to a receiver at a second sensor on the second module. Moreover, based on sensed conditions, power storage conditions, power needs, external sunlight, operations mode, etc., the receptacle 300 can switch sensing operations from the first sensor and the second sensor to a third sensor above the first sensor and a fourth sensor above the second sensor. This way, the receptacle 300 can raise the relative height of the sensors in the receptacle 300 used to sense operations as further described below.

The sensors can include a photoeye sensor, a motion sensor, a proximity sensor, a sonar sensor, a noise sensor, an image sensor, a camera, etc. In some embodiments, the sensors include photoeye sensors. Moreover, the first and second modules can include additional sensors. For example, the first and second modules can each include two or more sensors spaced a distance apart and having different heights in relation to the bin.

In some configurations, the first and second modules can each include an input and an output sensor. An input sensor can refer to a receiving sensor and an output sensor can refer to a transmitting sensor (e.g., through an emitter on the sensor). For example, the first module can include a first output sensor and, above the first output sensor, an input sensor. The second module can then include a second input sensor and, above the second input sensor, a second output sensor. This way, the lower output and input sensors can be configured to detect contents inside the bin at the lower position, and the raised or higher output and input sensors can be configured to be activated to detect contents inside the bin at the elevated position at times when it is more desirable to implement the raised sensors as opposed to the lower sensors. For example, the lowers sensors may be implemented when more compactions are desired, and the raised sensors can be implemented when running in a power-saving.

Moreover, the first and second inner walls can refer to parallel walls, adjacent walls, opposite walls, etc. For example, the first inner wall can be a wall on the left side of the receptacle and the second inner wall can be on the right side of the receptacle. Here, the modules and sensors can face each other. In some embodiments, the first inner wall can be a top wall which can include the inner top or ceiling of the receptacle, and the second inner wall can be a lower wall facing the top wall from a lower position such as a floor or divider. For example, the top wall can be the ceiling of the inside of the receptacle, as previously suggested, and the lower wall can be the top of the bin inside of the receptacle, which can serve as a floor facing the top wall.

In some cases, the receptacle can replace the second module with a mirror or another component capable of reflecting light or signals. For example, the receptacle can include the first module, and instead of, or in addition to, the second module, a mirror strategically placed inside the receptacle to reflect light or signals transmitted from a transmitter associated with the first module. In this regard, the transmitter can send the signal to a mirror that reflects the signal back to the first module and allows the receiver on the first module to receive the signal from the transmitter. In fact, the receptacle can be configured to include one or more additional mirrors or reflectors that allow a signal from the transmitter to bounce one or more times inside the receptacle before reaching the receiver. The number of mirrors or modules implemented can be based on operating conditions, preferences, receptacle size and shape, usage expectations or demands, location, policies, rules, etc.

In some cases, the receptacle can include a first mirror configured to reflect a signal from a transmitter on a first module to a receiver on the first module, and a second mirror configured to reflect the signal from a transmitter on a second module to a receiver on the second module. This way, the receptacle can be configured to use the first module and first mirror under normal conditions, and switch to the second module and second mirror under varying conditions, such as faulty conditions. To this end, the multiple modules and mirrors can provide redundancy, fault tolerance, or different operating modes, for example. In some cases, every side in the inside of the receptacle can include a mirror device or a module, including the roof/ceiling and floor of the receptacle. The floor of the receptacle can refer to the actual floor of the receptacle and/or the top of the bin inside of the receptacle, which provides a floor to the upper, inside portion of the receptacle. Here, the bin can be equipped with a top mirroring panel, a module on the bin's roof or top, or a module placed on top of the bin.

Next, the receptacle 300 determines a signal-detection characteristic including at least one of a signal detection status and a number of signal pulses associated with a signal detection (602). The signal-detection characteristic can include signal input and output characteristics. For example, the signal-detection characteristic can include whether the signal was detected at all, how many pulses were transmitted before the signal was detected or received, or any other traits or parameters of the signal. Moreover, the signal detection can refer to whether the signal was detected or not, for example. Thus, the number of signal pulses associated with the signal detection can refer to the number of pulses before the signal was detected, or the number of pulses without a signal detection at all.

Based on the signal-detection characteristic, the receptacle 300 then determines a current operating condition of the receptacle 300, the operating condition including at least one of a fullness level associated with the bin and an obstruction level associated with at least one of the first sensor and the second sensor (704). For example, the receptacle 300 can determine whether the signal was detected or received at all based on the signal-detection characteristic, and determine that there is currently an obstruction inside the receptacle 300 based on a failure to detect or receive the signal. Moreover, the receptacle 300 can also determine the obstacle levels, such as a dirt level, based on the number of pulses until the signal is detected or received. In some cases, as the sensors are clogged, dirty, or obstructed to a greater degree, it typically takes a greater number of pulses until the signal is successfully detected or received. Accordingly, the number of pulses can be used to calculate the obstruction levels of one or more sensors. Obstruction levels can refer to dirt levels, particle levels, performance levels, clogged levels, path-obstruction levels, light conditions, line-of-sight conditions, and so forth.

In some cases, the receptacle 300 can determine the obstruction levels based on an image of one or more sensors inside the receptacle 300. For example, the receptacle 300 can determine the obstruction level by analyzing an image taken of one or more of the sensors on the first or second modules, and/or any additional sensors. To this end, the receptacle 300 can include one or more cameras inside of the receptacle 300 to take images of one or more sensors inside the receptacle 300. The images from the camera can then be analyzed to determine the dirt or obstruction levels of the sensors. In some cases, the images from the camera can also be used to identify obstacles in the receptacle 300.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A method comprising:
controlling, via a controller, an operation of a first set of sensors and a second set of sensors in a storage receptacle, wherein each of the first set of sensors and the second set of sensors is located on a second inner wall of the storage receptacle, and wherein the first set of sensors comprises a first lower sensor and a first upper sensor, and the second set of sensors comprises a second lower sensor and a second upper sensor;
determining a signal detection characteristic comprising at least one of a signal detection status and a number of signal pulses associated with a signal detection;
based on the signal detection characteristic, determining a current operating condition of the storage receptacle, the current operating condition comprising at least one of a fullness level associated with the bin and an obstruction level associated with at least one of the first set of sensors and the second set of sensors; and
deactivating, as instructed by the controller, the first lower sensor and the second lower sensor and activating the first upper sensor and the second upper sensor to yield a raised sensor operation.

2. The method of claim 1, wherein the raised sensor operation is based on at least one of a volume of contents in the bin, a height of the contents inside the bin, an energy mode, a power storage level, an amount of outside light, and obstacle levels associated with at least one sensor from the first set of sensors and the second set of sensors.

3. The method of claim 1, further comprising:
transmitting a signal from the first lower sensor or the first upper sensor to one of the second lower sensor or the second upper sensor.

4. The method of claim 1, wherein at least part of the first set of sensors and the second set of sensors is located a distance above a bin inside the storage receptacle.

5. The method of claim 1, further comprising:
determining a change to a current operating mode of the storage receptacle based on the current operating condition; and
modifying, via a processor associated with the storage receptacle, the current operating mode of the storage receptacle to yield a modified operating mode based on the change, the modified operating mode comprising at least one of a compaction mode and an obstructed sensor mode.

6. The method of claim 5, wherein the compaction mode is based on the fullness level of the bin, the fullness level being identified based on a failure to detect the signal by a sensor associated with at least one of the first set of sensors and the second set of sensors, and the fullness level comprising a volume of contents inside the bin.

7. The method of claim 6, further comprising initiating, via the processor, a compaction of contents in the bin based on the fullness level, wherein the compaction is initiated based on a threshold volume.

8. The method of claim 5, wherein the obstructed sensor mode depends on the obstruction level as determined based on the number of signal pulses before the signal is detected by a receiver.

9. The method of claim 8, wherein the obstruction level comprises a material level on a sensor associated with at least one of the first set of sensors and the second set of sensors, and wherein a dirt level is based on an obstruction scale.

10. The method of claim 9, wherein the dirt level is calculated based on an amount of time between an output of the signal and an input of the signal.

11. The method of claim 8, further comprising, based on the obstruction level, modifying a sensing operation of the storage receptacle by deactivating the first lower sensor and the second lower sensor, and activating a first raised sensor and a second raised sensor, wherein the first raised sensor is located above the first lower sensor in relation to the bin and the second raised sensor is located above the second lower sensor in relation to the bin.

12. The method of claim 11, wherein the first lower sensor comprises a first input sensor and the second lower sensor comprises a first output sensor, and wherein the first raised sensor comprises a second output sensor and the second raised sensor comprises a second input sensor.

13. The method of claim 8, further comprising, based on the obstruction level, raising the distance above the bin of active sensors associated with the first set of sensors and the second set of sensors to yield a height adjustment.

14. The method of claim 13, wherein the height adjustment further comprises, based on the obstruction level, raising a first location associated with a first sensor to a second location that is higher than the first location in relation to the bin, and raising a third location associated with a second sensor to a fourth location that is higher than the third location in relation to the bin.

15. The method of claim 14, wherein raising the first location and the third location are performed automatically in response to a configuration signal from a processor coupled to the storage receptacle.

16. The method of claim 8, further comprising, based on the obstruction level, modifying a respective position of each of the first module and the second module to raise a height associated with the first sensor and the second sensor.

17. The method of claim 8, further comprising configuring, via a processor, the storage receptacle to operate at a reduced capacity based on the obstruction level calculated.

18. A receptacle comprising:
a processor;
an energy storage for powering operational functions performed by the receptacle;
a first sensor and a second sensor each being configured to detect a condition associated with the receptacle, and each the first sensor and the second sensor comprising a transmitter and a receiver, wherein the first sensor is located on a first inner wall of the receptacle and the second sensor is located on a second inner wall of the receptacle, and wherein the first sensor and the second sensor are located at a distance above a storage bin inside the storage receptacle;
a computer-readable storage medium having stored therein instructions which, when executed by the processor, cause the processor to perform operations comprising:

transmitting a signal from the transmitter to the receiver;

determining a signal detection characteristic comprising at least one of a signal detection status and a number of signal pulses associated with a signal detection;

based on the signal detection characteristic, determining a current operating condition of the receptacle, the current operating condition comprising at least one of a fullness level associated with the storage bin and an obstruction level associated with at least one of the first sensor and the second sensor; and based on the obstruction level, modifying a sensing operation of the receptacle by deactivating the first sensor and the second sensor and activating a third sensor on the first module and a fourth sensor on the second module.

19. The receptacle of claim 18, wherein the third sensor is located above the first sensor in relation to the storage bin and the fourth sensor is located above the second sensor in relation to the storage bin.

20. The receptacle of claim 18, wherein the computer-readable storage medium stores additional instructions which, when executed by the processor, result in operations further comprising:

determining a modification to a current operating mode of the receptacle based on the current operating condition; and modifying the current operating mode of the receptacle to yield a modified operating mode based on the modification, the modified operating mode comprising at least one of a compaction mode and an obstructed sensor mode, wherein:

the compaction mode is based on the fullness level of the storage bin, the fullness level being identified based on a failure to detect the signal by at least one of the first sensor and the second sensor, and the fullness level comprising a volume of contents inside the storage bin, and the obstructed sensor mode depends on a level of obstruction associated with at least one of the first sensor and the second sensor, the obstruction level being calculated based on a number of signal pulses measured prior to a detection of the signal.

* * * * *